(No Model.)
M. FLAMMANG.
PHOTOGRAPHIC CAMERA.
No. 246,738. Patented Sept. 6, 1881.
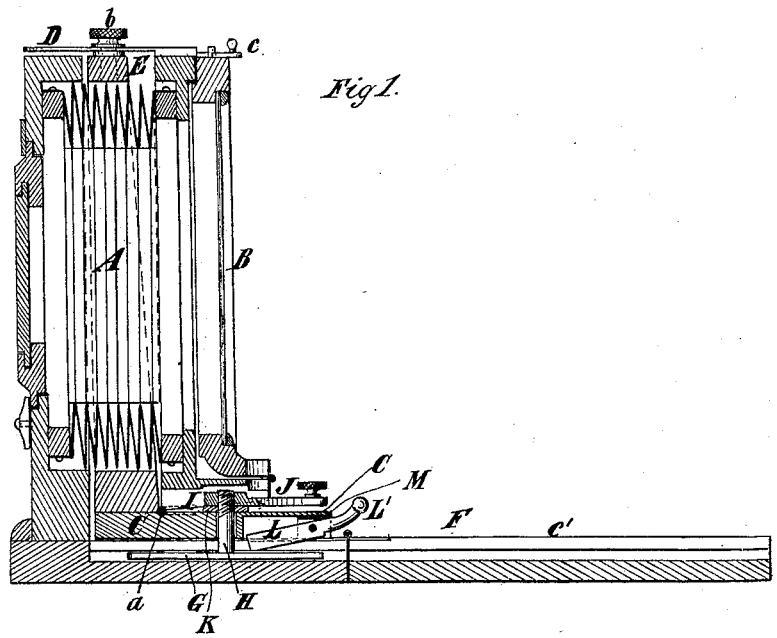
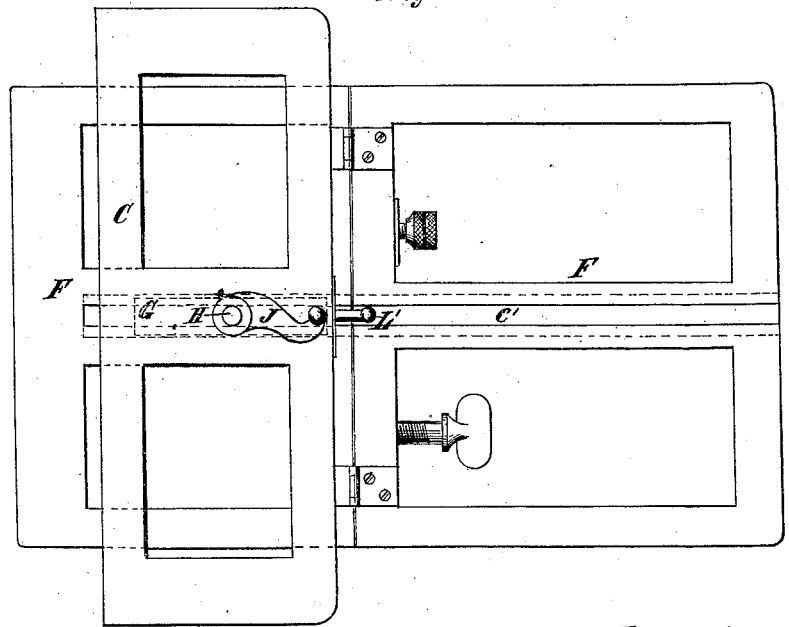
Witnesses:
T. J. Keane
Thomas E. Birch
Inventor:
Mathias Flammang
By his Atty.
Edwin H. Brown

UNITED STATES PATENT OFFICE.

MATHIAS FLAMMANG, OF NEWARK, NEW JERSEY, ASSIGNOR TO THE SCOVILL MANUFACTURING COMPANY, OF WATERBURY, CONN.

PHOTOGRAPHIC CAMERA.

SPECIFICATION forming part of Letters Patent No. 246,738, dated September 6, 1881.

Application filed May 25, 1881. (No model.)

*To all whom it may concern:*

Be it known that I, MATHIAS FLAMMANG, of Newark, in the county of Essex and State of New Jersey, have invented certain new and useful Improvements in Photographic Cameras, of which the following is a specification.

One object of my improvements is to provide a simple and convenient means for securing the back of a photographic camera in the different positions into which it may be adjusted.

To this end the improvements consist in the combination, with a flanged groove extending lengthwise of the base-frame of the camera, of a plate fitting therein under the flanges, a quick-pitched screw extending from said plate through the supporting-frame for the back of the camera and located under the back of the camera, a nut fitting said screw, and a lever for causing the screw and nut to clamp the said supporting-frame for the back of the camera to the base-frame of the camera, and extending rearwardly of the back of the camera. The screw may be rigidly affixed to the said plate, and the nut may have the lever affixed to it and capable of being moved thereon by means of the lever; or the nut may be rigidly affixed to the said plate, and then the screw may have the lever affixed to it for operating it.

Another object of my improvements is to provide for adjusting the back of the camera laterally at different angles to facilitate focusing.

To this end the improvements consist in the combination, with a pivotal connection between the supporting-frame for the back of the camera and the base-frame, of a tongue capable of being inserted in the groove of the base-frame to guide the camera-back, or of being removed from the said groove to permit of the adjustment of the back of the camera laterally at different angles.

In the accompanying drawings, Figure 1 is a central longitudinal section of a photographic camera embodying my improvements, and Fig. 2 is a plan of the supporting-frame for the back of the camera and of the base-frame of the camera.

Similar letters of reference designate corresponding parts in both figures.

A designates the body of the camera. It and its appurtenances, except as hereinafter described, may be of the usual or any other suitable form.

B designates the back of the camera, and C its supporting-frame. The back B of the camera is, connected near the forward edge to its supporting-frame C by hinges *a*, and is chamfered or beveled on the under side, so that it may be rocked forward and backward to facilitate focusing. A slide, D, secured to the back B of the camera, and connected with a yoke, E, erected on the supporting-frame C, by a set-screw, *b*, provides for securing the back of the camera at different angles. The back of the camera may be connected with the slide D by a latch, *c*, so that it may be opened when desirable.

F designates the base-frame of the camera. It is provided with a central longitudinal groove, *c'*, having at the top overhanging flanges.

G designates a plate, which may be made of brass or other suitable material, fitting in the groove *c'* below its flanges, and adapted to slide lengthwise thereof.

H designates a screw, which, as here shown, is rigidly affixed to the plate G, and extends upward from the same and through the supporting-frame C for the back B of the camera, and which is located under the said back of the camera. It has a thread or threads of very quick pitch.

I designates a nut applied to the end of this screw above the said supporting-frame C, and having affixed to it a lever, J, extending rearwardly beyond the back B of the camera. A very slight turn of this nut serves to move it a considerable distance lengthwise of the screw H, and hence suffices to clamp the supporting-frame to the base-frame. A washer, K, is applied to the screw H below the nut I. As shown, the screw and nut are arranged immediately below the ground-glass plate in the back B of the camera, and this arrangement is rendered practicable by the combination of the lever with them. Such arrangement is desirable, as then the camera-back may be turned at different angles on the screw as a pivot to facilitate focusing.

The combination of the lever with the quick-pitched screw forms a securing device for the supporting-frame which may be very conveniently and quickly operated, owing to the short motion of the lever, which suffices to secure the supporting-frame in position. Inasmuch as the free end of the lever can be manipulated by a push on either side of it, it need not extend as far behind the back B of the camera as a screw would require to be located in order that said screw or a nut applied to it would be grasped by the hand for the purpose of manipulating it; hence the said combination of parts enables the rear section of the base-frame to be folded up closer than where the screw or its nut has to be directly manipulated.

It is obvious that the nut I might be rigidly affixed to or formed in the plate G, and that the screw might be adjusted in the same and have the lever J rigidly affixed to it for operating it.

L designates a tongue, which may be made of metal, and which, as here shown, is pivoted to a plate, M, which is affixed to the rear of the supporting-frame, so that the said tongue may be made to enter the longitudinal groove $c'$ in the base-frame F. When this tongue is adjusted into the position shown in Fig. 1, so that its forward end enters the groove $c'$ in the said base-frame, the back B of the camera, when adjusted, will be guided by it; but when it is raised out of the groove the back B of the camera may be adjusted laterally at different angles. A handle, L', extending rearward of the pivot of the said tongue, serves as a means whereby the tongue may be manipulated.

It will be understood that when the back of the camera is adjusted at different angles the screw, nut, and lever may serve to secure it in position.

What I claim as my invention, and desire to secure by Letters Patent, is—

1. In a photographic camera, the combination, with a base-frame having a longitudinal flanged groove and the supporting-frame for the back of the camera, of a plate fitting in the said groove of the base-frame, a quick-pitched screw located under the back of the camera and extending from said plate through the said supporting-frame, a nut fitting said screw, and a lever for causing said nut and screw to clamp the said supporting-frame to the said base-frame, and extending rearward of the back of the camera, substantially as specified.

2. In a photographic camera, the combination, with a base-frame having a longitudinal flanged groove and the supporting-frame for the back of the camera, of a plate fitting in said groove in the base-frame, a quick-pitched screw rigidly affixed to said plate and extending through the said supporting-frame under the back of the camera, a nut applied to said screw above said supporting-frame, and a lever affixed to said nut and extending rearward of the back of the camera, substantially as specified.

3. In a photographic camera, the combination, with a base-frame, of a supporting-frame for the back of the camera, a pivotal connection between the said base-frame and the said supporting-frame, and a tongue capable of being inserted in a longitudinal groove in said base-frame to guide the said supporting-frame, or of being removed from the said groove to permit the supporting-frame and back of the camera to be adjusted laterally at different angles, substantially as specified.

4. In a photographic camera, the combination, with a base-frame, of a supporting-frame for the back of the camera, a pivotal connection between the said base-frame and supporting-frame, and a tongue pivoted to the said supporting-frame and adapted to be inserted in or removed from a longitudinal groove in the said base-frame, substantially as and for the purposes specified.

MATHIAS FLAMMANG.

Witnesses:
EDWIN H. BROWN,
A. C. WEBB.